Jan. 31, 1961 P. KARNOW 2,969,552
SELF-ORIENTED ARTICULATED SUPPORT
Filed March 10, 1958 2 Sheets-Sheet 1

INVENTOR.
PAUL KARNOW
BY
ATTORNEYS

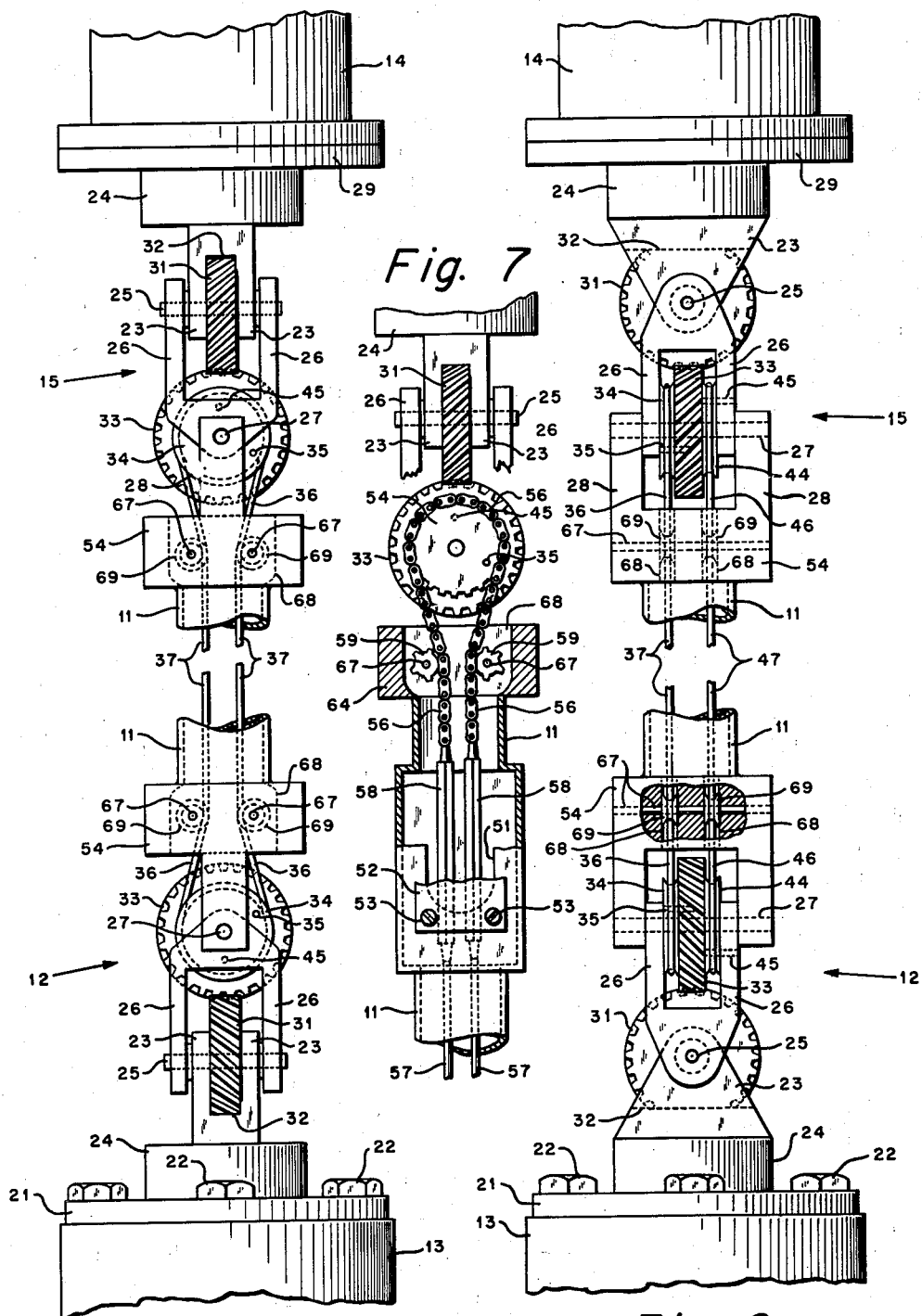

United States Patent Office 2,969,552
Patented Jan. 31, 1961

2,969,552
SELF-ORIENTED ARTICULATED SUPPORT
Paul Karnow, 3336 Decatur St., Philadelphia, Pa.
Filed Mar. 10, 1958, Ser. No. 720,516
9 Claims. (Cl. 9—8.3)
(Granted under Title 35, U.S. Code (1952), sec. 266)

The invention described herein may be manufactured and used by or for the Government of the United States of America without the payment of any royalties thereon or therefor.

The instant invention relates to a self-oriented articulated support for an object of fixed orientation buoyantly supported on a free fluid surface, and more particularly to a self-oriented articulated support for interconnecting a fixed base and a universally displaceable floating marker arranged to maintain the orientation of the floating marker constant relative to that of its fixed base.

In the art of floating channel markers and particularly illuminated channel markers, various means have been resorted to to maintain an illuminating means in a relatively fixed orientation, as by gimbal mounting means positioned by a pendulum to position the illuminating means relatively independently of a float or other buoyant supporting means continuously subjected to erratic and unpredictable displacements such as those caused by wind, waves, currents and tides. However, such known devices are generally characterized by a lack of means for positively maintaining an object such as an illuminating means in a fixed spatial orientation entirely independent of transient displacements of the buoyant structure supporting such illuminating means.

In contrast to the various prior art teachings, the device of the instant invention provides positively acting articulated means for maintaining an object such as an illuminating means in a predetermined fixed spatial orientation by connection to a fixed reference base through a linkage universally adjustable relative to the fixed base to permit unrestrained response of the object to the action of wind, waves, currents and tides and adaptable to displace such an object, in the event of collision with another floating object, in such a manner as to minimize the possibility of damaging either object as a result of the collision and without resulting in disorientation of the object positioned thereby. Hence, this arrangement is particularly suitable for supporting an illuminating means producing a beam of light which must be maintained in a predetermined fixed spatial orientation.

The device comprising the instant invention is particularly useful as a self-orienting light support for high-intensity directional seadrome channel lights, an application for which it is particularly suited by virtue of the fact that it is capable of maintaining a light or other object at a nearly constant safe small height above the surface of the water, thereby presenting a minimum hazard to seaplane operation. In addition, this device supported upon a fixed base located substantially below the minimum surface level of the water and provided with a freely articulated connection between this fixed base and the object to be supported offers an inherent safeguard against damage to itself or to an aircraft or other craft in the event of a collision by virtue of its minimized resistance to impact forces and, moreover, automatically returns to its operating position relative to the water surface and maintains its proper spatial orientation even after displacement of this device by collision with a seaplane, a boat, or other object borne on or in the water.

Thus, the device of the instant invention offers substantial advantages as a directional seadrome channel light over present installations wherein optically equipped directional lights of fixed orientation are rigidly mounted on wooden, metal, or concrete stationary piles that protrude out of the water to a height out of reach of wave action at the highest tide with the result that at low tide the stationary supporting pile is exposed by an additional amount corresponding to the fall of the tide and thus creates a substantial hazard to the safe operation of seaplanes in a channel so marked notwithstanding the use of large "day markers" attached to these piles to enhance their visibility during daylight operations.

An object of this invention is the provision of an articulated linkage arranged to interconnect a relatively fixed reference base and a freely movable object and provided with means operable to restrict said movable object to translational movement.

Another object is to provide articulated means for interconnecting a floating object and a submerged fixed base operable to maintain said floating object in a predetermined fixed spatial orientation relative to the fixed base.

Still another object is the provision of a directionally oriented floating object, a submerged fixed reference base, an articulated linkage interconnecting said floating object and said base, said articulated linkage including first means for maintaining the vertical orientation of said floating object constant relative to said base and second means for maintaining the azimuth orientation of said floating object constant relative to said base.

Yet another object of the instant invention is to provide a channel marker of fixed spatial orientation arranged to be maintained constantly at substantially a fixed distance above the free surface of a body of water.

A final object is the provision of a fixed orientation channel marker of minimum mass freely articulated so as to minimize the hazard of damage either to the channel marker or to an aircraft or other vessel in event of collision therewith.

Other objects and advantages of the instant invention will become more fully apparent upon thorough consideration of the following description and the accompanying drawings wherein.

Fig. 5 is a simplified front view, partially broken away, showing various details of one embodiment of the instant invention, Fig. 6 is a simplified side view corresponding to the showing in Fig. 5, also partially broken away to supplement the showing in Fig. 5, and Fig. 7 is a sectional view corresponding to a portion of Fig. 5 and showing additional details of the preferred embodiment of the instant invention.

Figure 1:
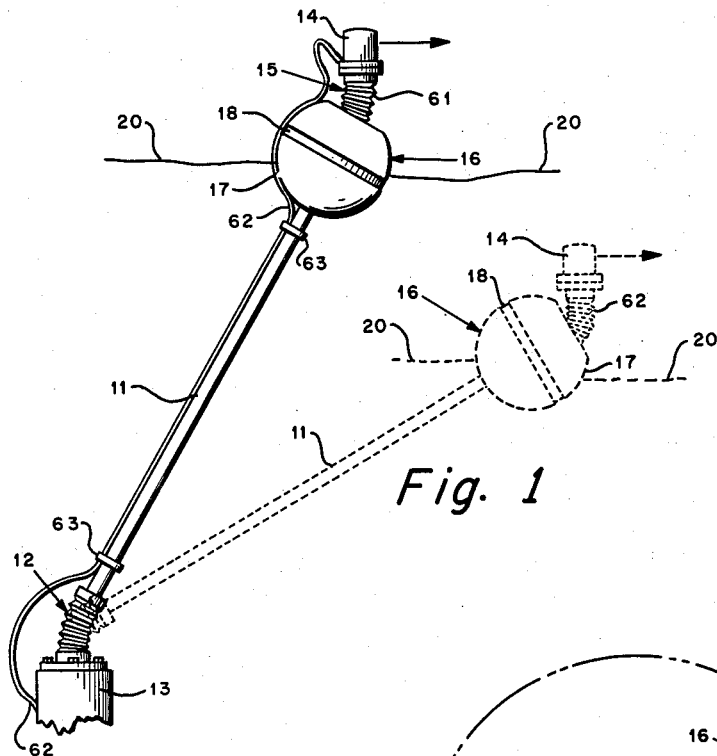
Fig. 1 is a schematic representation in side elevation of the device of the instant invention shown disposed in various possible positions about a horizontal axis.
Figure 2:
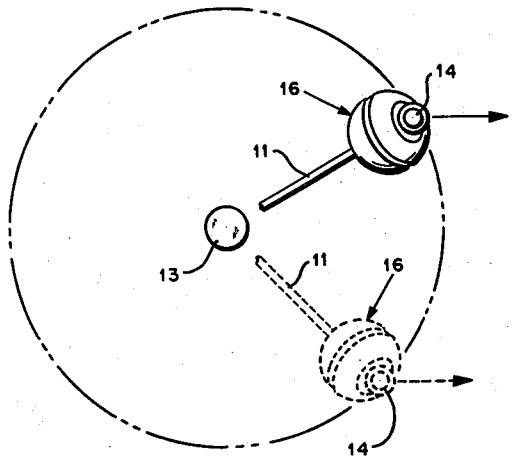
Fig. 2 is a simplified schematic plan representation of the device of the instant invention showing various representative positions which this device may occupy by angular displacement about a vertical axis.
Figure 4:
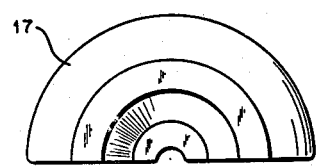
Fig. 4 is a top view of the segmental float chamber illustrated in Fig. 3.
Figure 3:
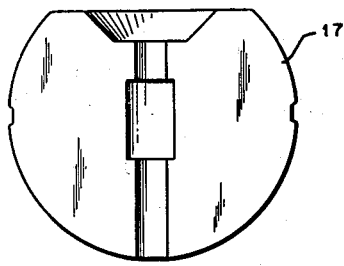
Fig. 3 is a side view of one suitable form for a segmental float chamber of the float assembly used on the device of the instant invention.

Referring now to the drawings wherein each of the respective reference numerals identifies like or corresponding parts in each of the several views, Figs. 1 and 2, considered together, illustrate the basic features of the instant invention and the mode of operation of this device dependent upon these features. Considering first the showing in Fig. 1, the substantially elongated hollow tubular articulated boom or arm 11 is attached through a suitable universal joint assembly 12 to the top of a suitable fixed base 13 such as a wooden, steel, or concrete piling, or the like, terminating at a safe minimum distance below the mean low water level of the surface 20 of a body of water, while a spatially oriented object such as a directional light assembly 14 is secured by means of a second universal joint assembly 15 to the upper end of the boom or arm 11. By virtue of position sensitive means, not visible in Figs. 1 and 2, incorporated in universal joint assemblies 12 and 15 and interconnected by suitable elements passing through the hollow tubular boom or arm 11 the light assembly 14 is supported at a substantially constant distance above the water surface 20 by a suitable buoy assembly 16 and is constantly maintained in a fixed orientation relative to a vertical reference axis so that a beam of light emanating from a source within the light assembly 14 is continuously directed in the same direction as indicated by the respective arrows in Fig. 1. Considering next the showing in Fig. 2, the respective arrows indicate that the light assembly 14 remains in a fixed position relative to a predetermined azimuth angle as indicated by the respective arrows, notwithstanding the direction or magnitude of displacement of the object 14 along a circular path disposed concentrically of the fixed base 13. Additional position sensitive means, not visible in Figs. 1 and 2, incorporated in the respective universal joint assemblies 12 and 15 and elements interconnecting these means extending through the hollow tubular member of beam or arm 11 are responsible for maintaining this azimuth orientation of the object 14 in the manner illustrated in Fig. 2.

In order to provide suitable buoyant support for mounting plate 29 the buoy assembly 16 may conveniently be composed of an opposed pair of self-contained and fully sealed segmental float chambers 17 arranged to encircle a portion of the boom or arm 11 adjacent its upper end and securely maintained in this position by a suitable clamping strap 18 encircling the periphery of the buoy assembly 16. The buoyant force generated by buoy assembly 16 must be sufficient to support the upper end of boom 11 in the fluid medium and support the joint assembly 12 and the particular object 14 installed above the surface of the fluid.

Since there are various standard directional channel light assemblies available commercially, the structural details of the object 14 have been eliminated, in order to avoid unnecessarily complicating the description of the instant invention. However, it is to be understood that a directional light assembly or any other object requiring spatial orientation may be fixedly secured to the upper end of the device comprising the instant invention by any suitable means such as attachment bolts, clamps, a screw thread, or the like.

Noting the general configuration of the instant invention as illustrated in Figs. 1 and 2 and upon consideration of the structural details of this device shown in Figs. 5, 6 and 7 and described below, it will be apparent that this invention provides positive control of the predetermined fixed spatial orientation of the object 14 supported by the articulated elongated boom 11 as the boom 11 is displaced angularly up to substantially 90° from a vertical position and concurrently displaced in a full 360° about a fixed reference base. Moreover, such displacements may occur an unlimited number of times within a 180° hemispherical locus, including multiple successive rotations through a full 360°.

Turning next to consideration of the showing in Figs. 5 and 6 for a detailed illustration of the means within universal joint assemblies 12 and 15 and the interconnecting boom 11 for continuously maintaining the relatively fixed spatial orientation of the object 14 and the base 13, it will be noted that two distinct positioning systems are included. First, the articulated supporting means for the spatially oriented object 14 includes the submerged fixed base 13 represented in Figs. 5 and 6 as the upper end of a piling or the like which may consist of wood, steel or concrete, or the like, driven into the bottom of a body of water and to which a base plate assembly 21 is secured by suitable attachment means such as bolts 22, as illustrated, rivets, welding, or the like, as appropriate. A pair of spaced upwardly projecting ears 23 are formed integrally with or attached to the base plate 21 and the ears 23 may project from a generally circular shoulder 24 for a reason which will become apparent below. The upwardly projecting ears 23 are provided with suitable circular openings therethrough to accommodate a lower shaft or bolt 25 for pivotal connection of the lower linking element 26 to the ears 23 projecting from the base plate 21. At the opposite end of linking element 26 a lower shaft or bolt 27, inserted through suitable holes in the lower linking element 26 and disposed perpendicular to lower shaft 25, pivotally connects this element to a pair of projecting members 28 extending downwardly from the lower end of the boom or arm assembly 11.

At the upper end of boom 11 a corresponding pair of upwardly extending projecting members 28 are pivotally connected to an upper linking element 26 by means of an upper shaft or bolt 27, parallel to the lower shaft 27, inserted through suitable holes in members 28 and upper linking element 26, while the other end of upper linking element 26 is pivotally connected by upper shaft or bolt 25, disposed perpendicular to upper shaft 27, to a pair of spaced downwardly projecting ears 23 formed integrally with or fixedly secured to the mounting plate 29 comprising a mounting means or base plate for the attachment of a spatially oriented object 14 to be supported thereby. Once again as at the lower end, the ears 23 may project from a generally circular shoulder 24 for reasons which will become apparent below.

By means of the various elements enumerated above, the spatially oriented object 14 such as a directional light is connected to the fixed base 13 by an articulated linkage which, by itself, does not relatively restrain the object 14 against assuming any attitude relative to that of the fixed base 13. Once again it is noted that the particular attachment means for securing the object 14 to mounting plate 29 is not specified since this depends upon the configuration of the object and the provisions provided therewith for mounting. However, it is to be understood that through bolts or other suitable attachment means are contemplated.

Considering next the restraining means for maintaining the object 14 in fixed spatial orientation relative to the reference established by fixed base 13, this restraining means consists of two separate systems supported by and connected to the various elements of the articulated linkage arranged to support object 14. First, the restraining means for maintaining the object 14 fixed relative to a vertical reference axis, that is in elevation, in the manner illustrated in Fig. 1 consists of a lower worm gear sector 31 disposed between the spaced upwardly projecting lower ears 23, supported by lower shaft 25, and restrained from rotation relative to said ears 23, and hence the base plate 21, by a flatted section 32 as shown, by a suitable pin, or by other comparable means. The lower worm 33 disposed between downwardly extending lower projecting members 28 and mounted with a pulley wheel 34 upon lower shaft 27 is positioned in operable engagement with the worm segment 31 and is fixedly secured to the pulley wheel or sprocket wheel 34 by means of a pin 35. A flexible element 36 which may consist of a length of flexible cable or a segment of roller chain as illustrated in Fig. 7, is interconnected by means of a pair of tension elements 37 extending through the hollow tubular boom 11 to a second flexible element 36 which may also be a length of flexible cable or a section of roller chain as shown in Fig. 7, encircling an upper pulley wheel or sprocket wheel 34 mounted upon the upper shaft 27 with upper worm gear 33 to which it is fixedly secured by means of a pin 35. The upper worm gear 33 supported by upper shaft 27 is also disposed between the upwardly extending upper projecting members 28 and positioned in operable engagement with the upper worm gear sector 31 supported upon upper shaft 25 and disposed between downwardly projecting upper ears 23 relative to which it is fixedly secured as by flat 32 or other suitable restraining means such as a pin connection. Second, the restraining means for maintaining the object 14 fixed relative to a predetermined azimuth angle includes a lower pulley wheel or sprocket wheel 44 mounted coaxially with lower worm gear 33 on the lower shaft 27 and secured in fixed relation to the lower linking element 26 by a pin 45 for angular displacement with element 26. A flexible element 46 which may in fact be a length of flexible cable or a section of roller chain, as shown in Fig. 7, encircles lower pulley wheel or sprocket 44 and is connected by means of a pair of suitable tension elements extending through hollow tubular boom 11 to a second flexible element which may also be a length of flexible cable or a section of roller chain encircling an upper pulley wheel or sprocket 44 mounted coaxially with upper worm gear 33 on upper shaft 27 and fixedly secured relative to upper linking element 26 by means of a pin 45 for angular displacement with element 26.

With particular respect to the worm drive shown in Figs. 5 and 6, it should be noted that the gear ratio between the respective lower and upper gear sectors 31 must be one-to-one to insure fixed spatial orientation of the object 14 relative to the base 13. In addition, for simplicity of construction, corresponding elements are used in the upper and lower gear trains which are relatively reversed as shown in Figs. 5 and 6, and, consequently, the worms employed must be of a reversible configuration so that driving motion can be transmitted from lower worm sector 31 through lower worm gear 33 and upper worm gear 33 to upper worm sector 31. Moreover, in order to produce proper relative displacement of the mounting plate 29 to maintain its fixed spatial orientation relative to the base plate 21, it is necessary to cut the 45° teeth of the upper worm gear 33 and the upper worm sector 31 in the sense opposite to that of the 45° teeth of the lower worm gear 33 and the lower worm sector 31, as illustrated in Figs. 5 and 6, when the interconnecting tension elements 37 are disposed parallel to each other as shown in Fig. 5. Also, in this configuration the respective worm sectors 31 are disposed concentric of the respective parallel shafts 25 while the respective worm gears 33 are rotatably mounted upon the respective parallel shafts 27 so disposed that the worm gears 33 are substantially coplanar and respectively perpendicular to the respective worm sectors 31. Finally, precision adjustment of the worms to attain the requisite minimum back-lash required for proper operation and to eliminate excessive back-lash may be provided by mounting one worm in each pair on a suitable adjustable eccentric shaft or bolt in a manner well known in the art.

Recalling that the simplified showing in each of Figs. 5 and 6 of the means for maintaining the orientation of object 14 fixed relative to base 13 includes a representation of various pulley wheels 34 and 44 associated with flexible elements 36 and 46 and tension elements 37 and 47 which elements are represented as lengths of flexible cable, it should be noted that reliable operation of the instant invention can only be secured by positive interconnections between the various components of these systems at all points. Hence, the flexible and tension elements such as those illustrated in Figs. 5 and 6 may, in fact, comprise continuous lengths of cable respectively including elements 36, 37, 36 and 37 and elements 46, 47, 46 and 47 which should be secured to their respective upper and lower pulley wheels 34, 34 and 44, 44 against relative slippage as by encircling each pulley wheel with one full turn of the cable and securing the cable to the pulley wheel at some intermediate circumferential point thereon in a location which permits the limited rotary motion of the respective pulley wheels necessary to the operation of the instant invention.

Alternatively, as noted briefly above, the preferred embodiment of the positive interconnection of the various rotary means and the flexible connecting elements may be achieved in substantially the same configuration of the instant invention by substituting sprocket wheels 54 for the respective pulley wheels 34 and 44 and by providing lengths of roller chain 56 in engagement with the sprocket wheels 54, as illustrated in the exemplary showing in Fig. 7, equally applicable to both the upper and lower ends of the device of the instant invention as illustrated in Figs. 5 and 6 and to both of the positioning systems included therein. In view of the limited rotation of the respective rotatably mounted elements of the instant invention the tension elements extending through the boom 11 and interconnecting the respective lengths of roller chain may in fact comprise rigid tension rods 57 upon which the tension may be imposed by suitable turnbuckles 58 arranged substantially as shown in Fig. 7 and accessible for adjustment of the tension through a suitable access opening 51 in the boom 11 normally sealably closed by a cover plate 52, as shown in Fig. 7, secured by suitable attachment means such as machine screws 53.

In addition to the basic operating elements of the respective positioning systems disclosed in Figs. 5 and 6 and described above, two pairs of idler pulley wheels 69 or sprockets 59 as appropriate may be mounted on a pair of supporting shafts 67 extending transversely of the boom 11, adjacent each end thereof, and through a pair of slots 68, in order to provide low friction guides to position the respective tension elements within a relatively more confined cross-section within the hollow tubular boom 11. In order to accommodate these guide means and the supporting means therefor the extremities of the boom 11 may be enlarged to form cylindrical shoulders 64 also required for an additional reason appearing immediately below.

For various reasons including the adverse effects of corrosion, it is necessary to protect the mechanism described above from the fluid in which it is immersed. Accordingly, the access opening 51 in the boom 11 is sealed by the installation of the cover plate 52 for this opening which includes a gasket or other sealing means. In addition, the universal joint assemblies 12 and 15 may conveniently be enclosed by suitable flexible protective means such as generally cylindrical bellows 61 of the general type represented in Fig. 1 fabricated from rubber or flexible plastic or the like, shaped and arranged to embody a high degree of flexibility and to sealably engage and be secured to the respective shoulders 24 and 54 or 64 adjoining each of the universal joint assemblies, as by ring clamps or a suitable adhesive compound, or both.

In operation, the device comprising the instant invention will be mounted as shown in Fig. 1 relative to the surface 20 of a body of water with the upper end of the fixed base 13 disposed at a minimum safe distance below mean low water to preclude contact of this fixed portion of the instant invention with the hull of an aircraft or other vessel reasonably to be expected in the area of a seadrome. The length of the boom or arm 11 will be selected to permit the float 16 to ride on the surface 20 at high tide with maximum wave action not exceeding safe operating conditions for seaplanes. The buoyant force provided by float 16 will maintain the object 14 and any device attached thereto at a substantially constant height above the surface 20 at all times regardless of the passage of waves or swells. In addition, the buoyant force provided by float assembly 16 and acting upon the upper end of the boom 11 will continuously position the boom 11 according to the instantaneous location of the surface 20 relative to the fixed base 13. Hence, this displacement of boom 11 relative to the fixed base 13 will generate the necessary driving force to actuate the respective positioning systems and thereby maintain the predetermined fixed spatial orientation of the object 14.

More particularly, the predetermined relative attitude of object 14 in relation to a vertical reference axis will be maintained continuously by the angular displacement of the boom 11 about lower shaft 25 accompanied by interaction of lower worm gear 33 with lower worm sector 31 as object 14 is moved to the left or right, as shown in Fig. 6, producing rotation of lower worm gear 33 transmitted through the flexible connecting elements to upper worm gear 33 operating on the lower side of upper worm sector 31 to produce an equal and opposite relative displacement of upper worm sector 31 and thereby maintain object 14 in the same spatial orientation relative to base plate 21 at all times. Concurrently, the fixed azimuth orientation of the object 14 illustrated in Fig. 2, is continuously maintained while the object 14 is offset to the right or left, as illustrated in Fig. 5, by the angular displacement of the boom 11 about lower shaft 27 producing relative displacement of the lower pulley wheel 44 secured to the lower linking element 26, which displacement is transmitted through the respective flexible elements to the upper pulley wheel 44 and thence to the upper linking element 26 in order to maintain the respective upper and lower linking elements 26 parallel at all times and under all conditions.

Thus, an object such as a conventional high-intensity directional seadrome channel light fixedly secured to the plate 29 may remain constantly properly oriented, both in azimuth and elevation at all times.

Where an object 14 such as a light source which requires a supply of electrical energy from a remote source is to be secured to mounting plate 29, this electrical energy can be supplied conveniently through a suitable cable 62 secured to the base 13 and at suitable points along the boom or arm 11 by attachment means 63 and thence to the object 14 mounted on mounting plate 29 with sufficient slack adjacent the respective universal joint assemblies 12 and 15 to assure unrestrained flexure of these portions. This relatively simple and readily serviceable arrangement of a source of power is feasible here since the disposition of the mounting plate 29 continuously remains unchanged relative to the position of the base 13, notwithstanding unrestricted translational movement around 360° and substantially 90° from vertical, or any movement or displacement in a 180° hemispherical locus. For the same reason, alternative provisions may be made for passing a continuous electrical cable through the base plate 21, the lower bellows 61, the hollow boom 11, the upper bellows 61, and the mounting plate 29 without any special electrical couplings such as slip rings.

Other directional objects such as radar reflectors or radar beacons or the like, may conveniently be substituted for or combined with a directional light source attached to the mounting plate 29.

In lieu of the base plate 21 secured by bolts 22 or other attachment means for securing it to a piling 13, the base may be shaped to form a plug fitting in non-rotatable relation to an upwardly disposed open socket secured to a piling or other support in which the device comprising the instant invention may be secured by the net unbuoyed underwater weight of this device. This arrangement offers the advantage of facilitated installation and removal of this device for servicing or replacement.

The respective means for maintaining relative orientation of the mounting plate 29 and the base plate 21 can of course be a purely mechanical arrangement, as illustrated in the embodiments fully described herein, or these positioning means may alternatively comprise suitable electrical, electro-mechanical or hydraulic systems.

The device comprising the instant invention providing for articulated support for a floating object and concurrently assuring fixed spatial orientation of that object with respect to a fixed reference offers very substantial advantages over fixed mounting of directional objects above the fluctuating surface of a body of water as a means of achieving directional stability while concurrently eliminating the inherent hazards of such fixed mounting in relation to aircraft and other vessels operating on such a body of water. In addition, the instant invention offers substantial advantages over various types of full floating buoys as means for maintaining an object at substantially constant height above water, because an element supported thereby is characteristically stabilized by an impositive means independent of wave action such as a pendulum so that such an object only approximates the desired orientation during significant time intervals. Hence, the instant invention may be said to combine the respective advantages of fixed pile mountings and buoy mountings for markers while it simultaneously eliminates the respective disadvantages.

From the foregoing description, it may be seen that the instant invention provides a relatively rigid, torsion resistant articulated mounting means particularly suitable for use as a support for a channel marker which means is light weight, compact, relatively simple to construct and maintain, and comprises a minimum mass readily displaced in the direction of prevailing forces to minimize the stresses imposed upon the supporting assembly itself and effective to prevent damage to the support itself or to an aircraft or other object in the event of a collision.

Obviously many modifications and variations of the present invention are possible in the light of the above teachings. It is therefore to be understood that within the scope of the appended claims the invention may be practiced otherwise than as specifically described.

What is claimed is:

1. A self-oriented articulated support comprising a base means supported in fixed relation to a solid submerged surface, a movable mounting means spaced a substantial distance from said base means, an articulated linkage means interconnecting said base means and said mounting means and capable of assuming any position in a 180° hemispherical locus, said linkage means including a substantially elongated rigid boom connected at its opposite ends to first and second flexible coupling means respectively connected to said base means and said mounting means, each said flexible coupling means including an intermediate linking element and first and second spaced pivotal connecting means, each disposed perpendicular to a plane coincident with the pivot axis of the other pivotal connecting means, respectively pivotally connecting the opposite ends of said intermediate linking element to adjoining elements of said pivotal coupling means, buoyant means attached to said boom adjacent to said mounting means for maintaining said mounting means at a substantially constant predetermined distance above an ambient free surface of a fluid medium, and a restraining means supported by said linkage means and actuated by displacement of said linkage means, said restraining means including a first positioning system effective to maintain said mounting means in a predetermined fixed azimuth orientation as said linkage means is displaced angularly about said base means in azimuth and a second positioning system effective to maintain said mounting means at a predetermined fixed vertical orientation as said linkage means is displaced angularly in elevation about said base means.

2. A device as described in claim 6, wherein each said positioning system includes first and second rotatable elements respectively mounted on said first pivotal connecting means of the respective first and second coupling means and flexible connecting means positively interconnecting said first and said second rotatable elements for concurrent rotation thereof, said first positioning system additionally including a first pair of worm gear means mounted coaxially with the respective rotatable elements of said first positioning system, locking means securing said first pair of worm gear means to the respective rotating elements for rotation therewith, and a second pair of worm gear means respectively mounted upon the second pivotal connecting means of the respective first and second coupling means and respectively operatively engaged with the first pair of worm gear means, and locking means for restraining said second pair of worm gear means against angular displacement relative to said base means and said mounting means, respectively, and said second positioning system additionally including locking means securing the respective rotatable elements of said second positioning system to the respective intermediate linking elements of said first and said second coupling means, respectively, for rotation therewith.

3. A device as described in claim 2, wherein each said rotating element comprises a sprocket wheel and each said flexible connecting means includes flexible roller chain sections engaged with respective sprocket wheels and rigid tension rods interconnecting the ends of the respective roller chain sections.

4. A self-oriented articulated support for a sea marker comprising; fixed base means; universally movable mounting means spaced from said fixed base means; articulated linkage means maintaining said mounting means in a predetermined spatial orientation, said articulated linkage means comprising, a first gear fixed to said universally movable mounting means, a second gear fixed to said base means, arm means, a third gear carried on one end of said arm means meshing with said first gear, a fourth gear carried in an opposite end of said arm means meshing with said second gear, and flexible tension means interconnecting said third and fourth gears for causing said third and fourth gears to turn through equiangular increments in the same direction, and float means carried by said arm means.

5. A self-oriented articulated support comprising; base means releasably restrained relative to a fixed supporting surface; movable mounting means spaced from said base means; rigid elongated link means extending between said base means and said mounting means; first flexible coupling means including a pair of interacting members interconnecting said base means and one end of said link means; second flexible coupling means including a pair of interacting members interconnecting said mounting means and the other end of said link means; buoyant means attached to said link means; and flexible restraining means supported by said members, and said members of said first and second flexible coupling means being operable independent of any displacement of said link means to maintain said mounting means in a predetermined fixed spatial orientation relative to said base and yet permit said link means to assume any position in a full 180° hemispherical locus.

6. A self-oriented articulated support comprising; base means adapted to be supported in fixed relation to a solid submerged surface; movable mounting means spaced a substantial distance from said base means; articulated linkage means interconnecting said base means and said mounting means, said linkage means including an elongated rigid boom connected at its opposite ends to first and second articulate flexible coupling means each comprising a pair of meshing gears respectively connected to said base means and said mounting means, buoyant means attached to said boom adjacent to said mounting means for maintaining said mounting means above an ambient free surface of a fluid medium, and restraining means supported by said linkage means for preventing the turning of one of each pair of meshing gears relative to said base means and said mounting means respectively and actuated by displacement of said linkage means operable to maintain said mounting means in a predetermined fixed spatial orientation independent of displacement of said linkage means to any position in a 180° hemispherical locus.

7. A device as described in claim 6, wherein each said flexible coupling means and said restraining means further comprise a flexible tension element interconnecting the other gear of each pair of meshing gears for causing the same to turn in the same direction, each gear of said pairs of gears being disposed perpendicular to the other gear of said pairs of gears, and said gears each having helical teeth.

8. A self-oriented directional channel light assembly for use as a sea marker including, a relatively fixed support, base means secured in fixed relation to said support, movable mounting means spaced from said base means, a directional light mounted upon said movable mounting means, articulated linkage means having two pairs of meshing gears interconnecting said base means and said mounting means and movable to any position in a full 180° hemispherical locus, restraining means supported by and cooperating with said linkage means operable to maintain said mounting means in a predetermined fixed spatial orientation independent of displacement of said articulated linkage means, and float means carried by said linkage means.

9. A self-oriented directional light assembly comprising, a fixed support, a base means releasably restrained in fixed relation to said support, movable mounting means spaced a substantial distance from said base means, a directional light secured to said mounting means in a predetermined spatial orientation, rigid elongated link means extending between said base means and said mounting means, first flexible coupling means interconnecting said base means and one end of said link means, second flexible coupling means interconnecting said mounting means and the other end of said link means, buoyant means attached to said link means for supporting said mounting means above a free fluid surface, and restraining means supported and controlled by said link means to maintain said directional light in its predetermined fixed spatial orientation relative to said support and yet permit said link means to assume any position in a full 180° hemispherical locus.

References Cited in the file of this patent

UNITED STATES PATENTS

| | | |
|---|---|---|
| 1,055,785 | Nichols | Mar. 11, 1913 |
| 2,475,746 | Kenyon | July 12, 1949 |
| 2,557,590 | Beckerman et al. | June 19, 1951 |
| 2,585,579 | Norden | Feb. 12, 1952 |
| 2,837,753 | Lewis | June 10, 1958 |

FOREIGN PATENTS

| | | |
|---|---|---|
| 760,807 | Great Britain | Nov. 7, 1956 |

UNITED STATES PATENT OFFICE
CERTIFICATE OF CORRECTION

Patent No. 2,969,552                January 31, 1961

Paul Karnow

It is hereby certified that error appears in the above numbered patent requiring correction and that the said Letters Patent should read as corrected below.

Column 3, line 66, strike out "in"; column 8, line 69, for the claim reference numeral "6" read -- 1 --; column 10, line 35, beginning with "9. A self-oriented directional", strike out all to and including "a full 180° hemispherical locus." in line 52, same column 10; in the heading to the printed specification, line 5, for "9 Claims" read -- 8 Claims --.

Signed and sealed this 12th day of September 1961.

(SEAL)
Attest:

ERNEST W. SWIDER
Attesting Officer

DAVID L. LADD
Commissioner of Patents
USCOMM-DC